(12) United States Patent
Bastianen

(10) Patent No.: US 8,302,982 B2
(45) Date of Patent: Nov. 6, 2012

(54) BICYCLE, SENSOR, AND METHOD

(75) Inventor: Johannes Petrus Catharina Michael Bastianen, Zeist (NL)

(73) Assignee: Accell Group N.V., Heerenveen (NL)

( * ) Notice: Subject to any disclaimer, the term of this patent is extended or adjusted under 35 U.S.C. 154(b) by 12 days.

(21) Appl. No.: 12/679,842

(22) PCT Filed: Sep. 29, 2008

(86) PCT No.: PCT/NL2008/050625
§ 371 (c)(1),
(2), (4) Date: Jun. 25, 2010

(87) PCT Pub. No.: WO2009/041820
PCT Pub. Date: Apr. 2, 2009

(65) Prior Publication Data
US 2010/0264622 A1    Oct. 21, 2010

(30) Foreign Application Priority Data
Sep. 27, 2007   (NL) ...................................... 1034435

(51) Int. Cl.
*B62K 19/30* (2006.01)
(52) U.S. Cl. .................................................. 280/281.1
(58) Field of Classification Search ............... 280/281.2, 280/285, 286, 288.4, 296, 288; 301/110.5, 301/124.2
See application file for complete search history.

(56) References Cited

U.S. PATENT DOCUMENTS

| | | | |
|---|---|---|---|
| 5,312,166 A * | 5/1994 | Nagano | 301/110.5 |
| 5,326,157 A * | 7/1994 | Nagano | 301/110.5 |
| 6,354,980 B1 | 3/2002 | Grant | |
| 6,676,554 B2 | 1/2004 | Dal Pra | |
| 7,322,437 B2 * | 1/2008 | Toyoda | 180/219 |
| 7,661,771 B2 * | 2/2010 | Nimura et al. | 303/137 |
| 2005/0247499 A1 * | 11/2005 | Toyoda | 180/219 |

FOREIGN PATENT DOCUMENTS

| | | |
|---|---|---|
| EP | 0983934 A1 | 3/2000 |
| EP | 1010612 A1 | 6/2000 |
| EP | 1591355 A2 | 11/2005 |
| WO | 01/30643 A1 | 5/2001 |
| WO | 2005/021368 A1 | 3/2005 |

\* cited by examiner

*Primary Examiner* — Tashiana Adams
(74) *Attorney, Agent, or Firm* — Rothwell, Figg, Ernst & Manbeck, P.C.

(57) ABSTRACT

A bicycle, provided with wheels rotatable about axles, which axles are detachably coupled, in a manner secured against rotation, to a frame (3) of a bicycle (1), wherein the detachable coupling of at least one of the axles (5) is provided with a sensor (S). The invention further provides a method for determining at least one bicycle use parameter, for instance a pedal force, torque and/or chain force generated by or under the influence of a cyclist, wherein the bicycle is provided with a sensor for producing a measuring signal, which measuring signal is processed for the purpose of determining the bicycle use parameter.

27 Claims, 8 Drawing Sheets

BICYCLE, SENSOR, AND METHOD

CROSS REFERENCE TO RELATED APPLICATIONS

This application is a 35 U.S.C. §371 National Phase Entry Application from PCT/NL2008/050625, filed Sep. 29, 2008, and designating the United States, which claims priority under 35 U.S.C. §119 to Dutch Patent Application No. 1034435 filed Sep. 27, 2007, which is incorporated herein in its entirety.

BACKGROUND OF THE INVENTION

1. Field of the Invention

The invention relates to a bicycle, a sensor, use of a sensor, a method for determining at least one bicycle use parameter, and to a method for controlling a bicycle part.

2. Description of the Background Art

A bicycle provided with a sensor is known per se. With a known bicycle, the sensor forms an integral part of the stationary rear axle of the bicycle, and can measure bending of the axle for determining a pedal force generated by a cyclist. In another known system, a hub of a rear wheel of the bicycle is provided with a coupling sensor.

A drawback of known system is the complexity thereof, and the necessity to disassemble the entire bicycle wheel, for instance to replace the entire axle if the sensor malfunctions.

SUMMARY OF THE INVENTION

The object of the present invention is to provide a simpler and relatively inexpensive alternative.

To this end, according to an advantageous embodiment of the invention, a bicycle is characterized by the features of claim 1.

A bicycle, provided with wheels rotating about axles, which axles are coupled to a frame of the bicycle by means of detachable means in a manner secured against rotation, is advantageously characterized in that the means of at least one of the axles are provided with a sensor.

In this manner, a particularly simple bicycle sensor configuration is achieved which is relatively inexpensive to design. A particular advantage is that neither a bicycle axle, nor bicycle frame parts need be replaced if the sensor malfunctions. Furthermore, the invention can simply be utilized on an already existing bicycle, by replacing a detachable means (for coupling a bicycle wheel axle to the frame in a manner secured against rotation) of this bicycle with the present means provided with the sensor.

According to a simple further elaboration of the invention, the sensor can for instance be integrated in nut means, which nut means are designed for cooperation with an axle part for coupling the axle to the bicycle frame.

According to an especially advantageous elaboration, wherein the sensor can be accessed well and be disassembled relatively simply, the sensor is provided, after assembly, between, on the one side, nut means engaging the respective axle and, on the other side, a part of the bicycle frame.

In particular, a detachable means provided with a sensor can for instance be provided on an axle part, which axle part projects axially outward with respect to a bicycle frame part, and wherein the detachable means is preferably fitted between, more particularly is clamped between, the bicycle frame part and an axle fixing means.

A relatively inexpensive design comprises a bicycle, wherein the sensor forms part of an annular element, for instance a ring or similar element provided with an axle-receiving opening. In particular, an axial thickness of this element is smaller than a diameter of an outer circumference. In this manner, furthermore, a particularly compact configuration can be achieved.

Particularly advantageous is an elaboration wherein the sensor is integrated with an axle rotating blocking element, in particular an anti-rotating ring or no-turn washer, which element is configured for blocking rotation of the axle after assembly. No-turn washers as such are known from practice, however, to the present day nobody has come up with the favourable idea to provide such a no-turn washer (integrally, in particular undetachably) with a sensor.

According to a further elaboration, the detachable means comprise a housing (for instance a hollow, annular housing) which is provided with the sensor. Preferably, the housing also comprises sensor signal processing means, for instance an electronic circuit. According to an advantageous elaboration, the sensor is provided with a sensor carrier designed to engage the bicycle axle, and the sensor housing is designed to engage both a bicycle frame part and the sensor carrier, for blocking axle rotation with respect to the bicycle frame.

According to a preferred embodiment, the axle whose means mentioned are provided with the sensor, is the axle of a wheel of the bicycle driven by a chain. In that case, the axle can be provided, in particular, with a hub, which hub is preferably provided with a hub motor. The bicycle can also be provided with a different type of auxiliary motor. In an alternative embodiment, the axle whose means mentioned are provided with a sensor is the axle of a wheel of a bicycle driven by a chain, while another wheel of the bicycle (for instance a front wheel) is drivable by an auxiliary motor (for instance a respective hub motor or the like).

Accordingly, the present invention can be advantageously utilized on a bicycle comprising an auxiliary motor, this is, however, not necessary: bicycles without auxiliary motor can be provided with the invention too.

According to a further elaboration, the sensor is designed for producing a measuring signal, wherein the bicycle is provided with a processor designed to determine, on the basis of the measuring signal, at least one bicycle use parameter, for instance pedalling force, torque and/or chain force. It will be clear to the skilled person that such a processor can be designed in different manners, and can comprise, for instance, suitable microelectronics, a computer and/or the like.

Furthermore, a sensor as such can be configured in different manners.

The present invention further provides a sensor evidently intended and suitable to be utilized in a bicycle according to the invention. In particular, the sensor is integrated with a detachable means which is configured for coupling a bicycle wheel—after assembly—to a bicycle frame in a manner secured against rotation. As mentioned, the sensor can for instance form part of an axle rotating blocking element, for instance a no-turn washer.

The present invention also provides use of a sensor according to claim 12 or 13, wherein the sensor forms part of a bicycle and produces a measuring signal, which measuring signal is processed for determining at least one bicycle use parameter, for instance pedal force, torque and/or chain force.

In addition, the invention provides a method for determining at least one bicycle use parameter, for instance a pedal force, torque and/or chain force generated by or under the influence of a cyclist, wherein the bicycle is provided with a sensor according to claim 12 or 13 for providing a measuring signal, which measuring signal is processed for the purpose of determining the bicycle use parameter. Other use parameters, which can be definable on the basis of, for instance, a sensor signal may comprise a pedal speed, pedalling frequency, and thus, for instance, a cycling speed and/or power or the like produced by the cyclist. The term "bicycle use parameter" should therefore be explained broadly, and comprises, for instance, a parameter which depends on, or is related to cyclist's forces applied by a cyclist during use.

The invention further provides a method for controlling a controllable (for instance regulable) bicycle part, for instance an auxiliary motor (in particular a hub motor) or an acceleration system, wherein the bicycle part is controlled while utilizing at least one bicycle use parameter which is determined by a sensor according to claim 12 or 13 and/or by means of a method according to claim 15.

BRIEF DESCRIPTION OF THE DRAWINGS

Further advantageous elaborations of the invention are described in the subclaims. Presently, the invention will be elucidated on the basis of a non-limitative exemplary embodiment and the drawing. In the drawing:

DETAILED DESCRIPTION OF THE INVENTION

Figure 1:
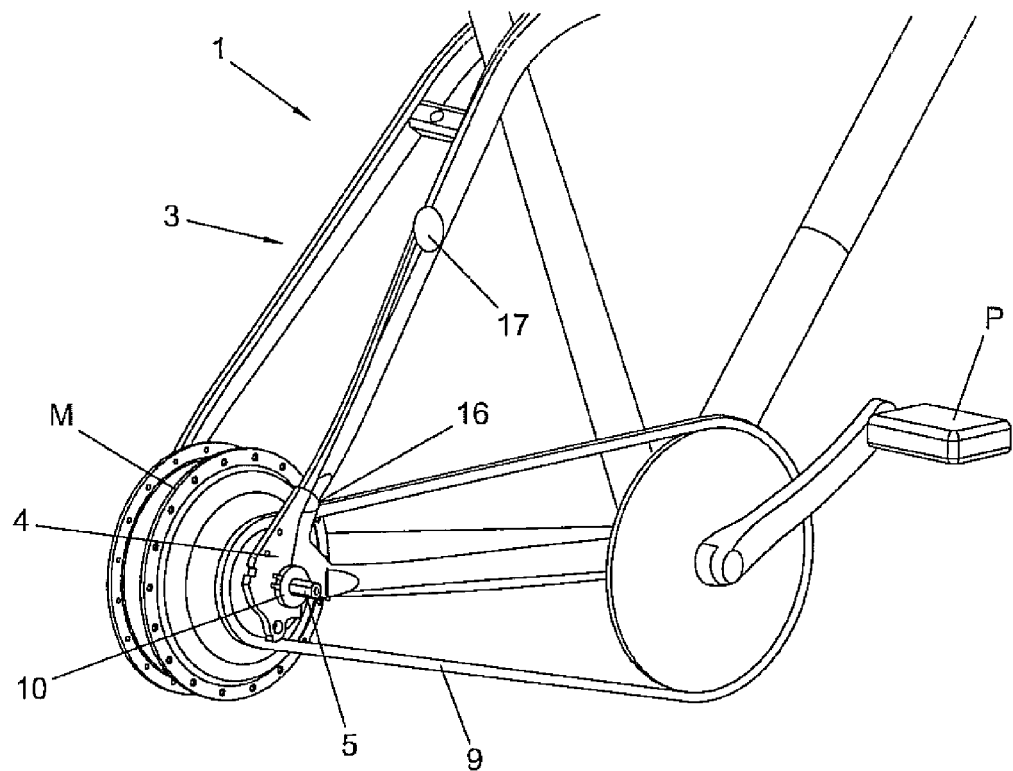
FIG. 1 shows a part of an exemplary embodiment of a bicycle, in perspective drawing.

In this application, identical or corresponding features are indicated with identical or corresponding reference numerals.

FIGS. 1-4 schematically show a part of a bicycle 1, provided with wheels rotatable about axles. In the Figures, only a bicycle part comprising a rear axle 5 is represented. The rear axle 5 is immovably coupled to a bicycle frame 3 by means of detachable means 10, 11 (at least, coupling elements 10, 11) in a manner secured against rotation (i.e. the axle 5 cannot rotate with respect to the frame). The rear axle 5 can be uncoupled from the frame 3 by means of a suitable operation (loosening) of the detachable means 10, 11. A front axle (not represented) can be coupled in a similar manner to a respective bicycle frame part. Such a wheel axle coupling secured against rotation is generally known per se from practice. The detachable means 10, 11 are in particular detachable with respect to (i.e. separable from) the respective wheel axle 5 to hold. The detachable means 10, 11 are also in particular detachable with respect to (i.e. separable from) the bicycle frame 3.

Figure 2:
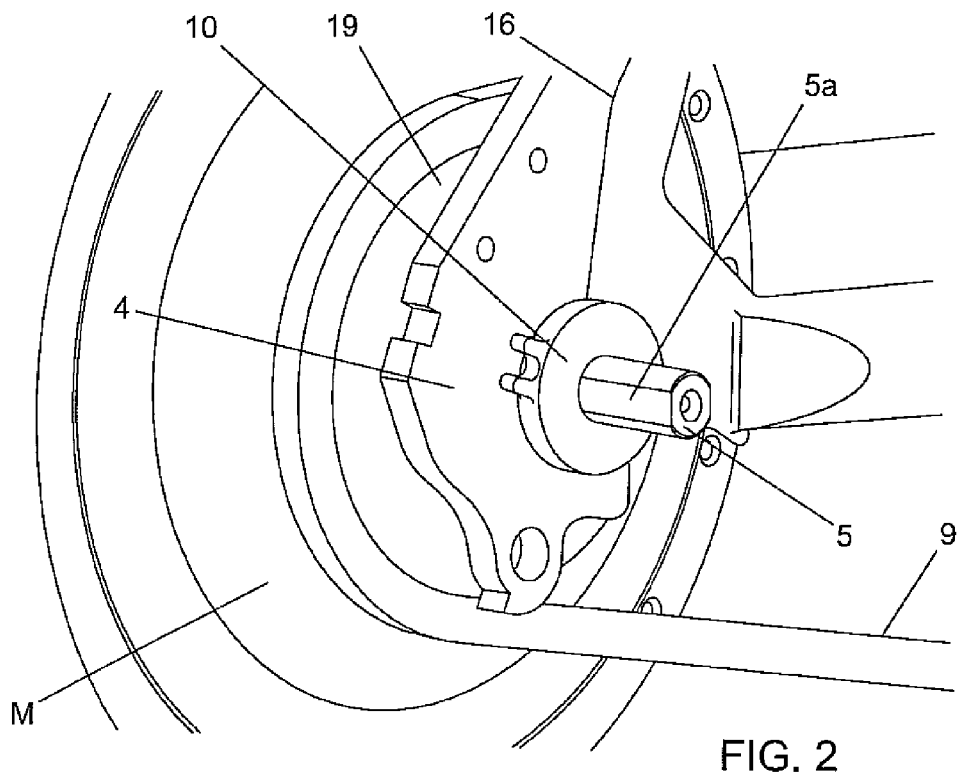
FIG. 2 shows a detail of FIG. 1.
Figure 3:
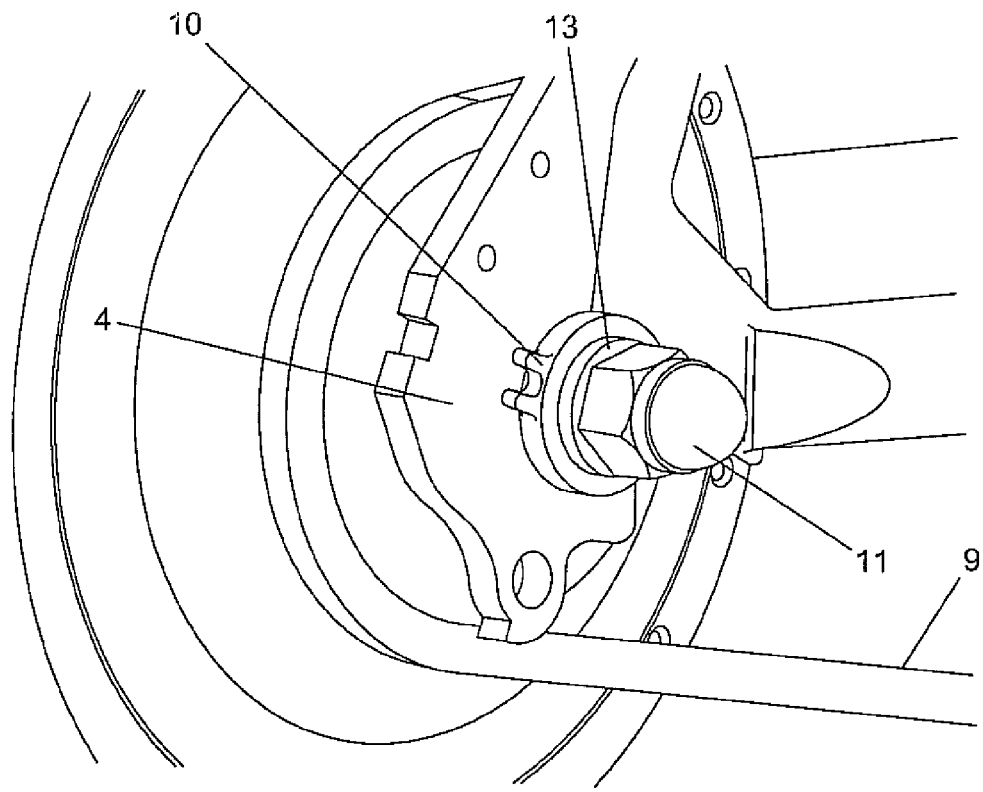
FIG. 3 shows a similar detail as FIG. 2, wherein an axle fixing nut is provided on an axle end.

As shown in further detail in FIGS. 1-3, the bicycle frame 3 is provided with two frame parts 4 (only a right hand part 4 is visible), which are generally mirror-symmetrical with respect to each other and wherebetween the stationary wheel axle 5 extends. These frame parts 4 are also called dropout ends. As a rule, the fixed (i.e. stationary with respect to the frame 3) wheel axle 5 is provided with two end pieces (axle parts) 5a, which axle parts 5a, after assembly, each project axially outwards with respect to the respective dropout end 4 of the bicycle frame 3 (see FIG. 2, 3). In other words, the axle end pieces 5a project outside surfaces of the frame facing away from each other, in particular for receiving the detachable means 10, 11 (see further).

Figure 5:
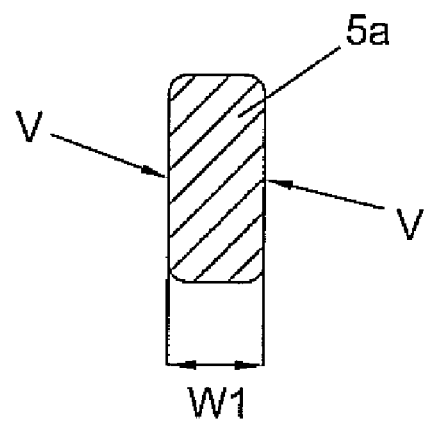
FIG. 5 shows a cross-section of the end piece of the rear axle of the exemplary embodiment represented in FIG. 1.

A cross section of an axle end part 5a mentioned is schematically represented in FIG. 5. In particular, the axle end piece 5A has a non-circular outer contour. In other words, the outer surface of the end piece 5a is non-circular viewed in cross section.

The axle end piece is further preferably provided with screw thread (serving as bolt means) in order to cooperate with a fixing bolt 11.

More particularly, the (for instance each) axle end piece is provided with two parallel blocking surfaces V facing away from each other, which after assembly extend for instance substantially in vertical direction, or in a different direction. A thickness of the end piece 5a, at least a distance between the blocking surfaces V, is indicated in FIG. 5 with arrows W1. An axle end piece 5a can also be formed in a different manner, for instance be angular, elliptical or otherwise non-circular, viewed in cross section.

The wheel axle 5 is in particular provided, in a known manner, with a hub bearing mounted so as to be rotatable with respect to the wheel axle for holding the rotatable wheel (not represented). A force Fp, applied by a cyclist to pedals P (see FIG. 4) can be transmitted via a bicycle chain 9 to the sprocket 19 for driving the wheel. This pedal force leads to a particular chain stress Fc in the chain.

The exemplary embodiment is furthermore provided with a hub with integrated motor (a 'hub motor') M, for driving the wheel, for instance as auxiliary drive.

In the exemplary embodiment, the detachable means, which are configured for holding the wheel axle to the frame in a manner secured against rotation, comprise no-turn washers 10 and nuts 11 (a set comprising such a ring 10 and nut 11 is represented in FIG. 3).

FIGS. 6A-6D show a no-turn washer 10 in more detail. The washer 10 is an axle rotating blocking element, element is configured for blocking axle rotation (of the axle 5) after assembly. To this end, after assembly, the washer 10 engages the wheel axle 5. The washer 10 can be manufactured from different materials, for instance one or more metals, steel, hardened plastic (for instance fiber reinforced plastic) or the like.

In particular, the no-turn washer 10 is designed to cooperate with the non-circular outer contour (at least the cross section of the outer surface) of the axle end piece 5a for blocking rotation of the axle with respect to a bicycle frame part 4. To this end, the washer 10 is provided with a passage 10a, having a width W2 designed for engaging blocking surfaces V of the axle. The width W2 is such that the passage 10a can enclose the axle end piece with little clearance (in particular less than 1 mm). This width W2 is for instance approximately equal to or a little greater than the axle end width W1. In lateral direction too, the no-turn washer 10 can hold the axle with little clearance (see FIG. 2). According to a further elaboration, the washer 10 has an axial thickness T which is smaller than a diameter D of an outer circumference (see FIG. 6C). The ring can for instance be designed to be relatively flat.

Preferably, the no-turn washer 10 is also designed for engaging a part of the bicycle frame, in particular said dropout end 4, as is the case in the exemplary embodiment. To this end, the washer 10 can be provided with, for instance a blocking nose (or projection) 10b which engages a slot of the dropout end 4 of the bicycle frame, at least, reaches into this slot. With the exemplary embodiment, this blocking nose 10b projects over a particular distance from a side surface of the washer 10, which side surface, after assembly, is proximal to an outside of the dropout end. The other side surface of the no-turn washer (which, after assembly, is remote from the respective dropout end 4) may be of smooth design, and can, after assembly, abut against a nut 11 directly, or via an optional intermediate ring 13 (see FIG. 3). Preferably, after assembly, the washer 10 is fitted between, more particularly clamped between the dropout end 4 and an axle fixing bolt 11 tightened on the axle (as in FIG. 3), utilizing or not utilizing for instance one or more additional intermediate rings 13.

According to a further elaboration, the no-turn washer 10 is designed such that it can effect a predetermined, desired positioning of the wheel axle 5 with respect to the bicycle frame. In the present elaboration, this positioning is such that, after assembly, the blocking surfaces V of the axle extend for instance substantially in vertical directions. After assembly, the blocking surfaces V can also extend in another direction.

It is particularly advantageous when the detachable mans 10, designed to prevent rotation of the wheel axle 5, are provided with a sensor S. The sensor S can be integrated with the means 10 in different manners, for instance be included in a suitable cavity of the means 10, and/or be attached to those means 10.

In particular, after assembly, the sensor S is provided between, on the one side, nut means 11 engaging the respective axle 5 and, on the other side, a dropout end 4 of the bicycle frame 3.

It is further advantageous when, after assembly, the sensor S is at the same horizontal level as the nearby stationary wheel axle 5, this is however not necessary.

Figure 9:
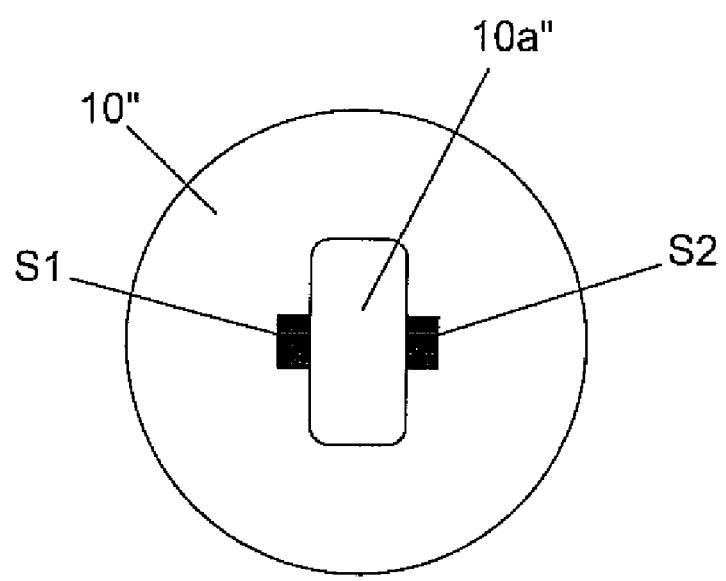
FIG. 9 shows a similar view as FIG. 7A of a further alternative elaboration.
Figure 6C:
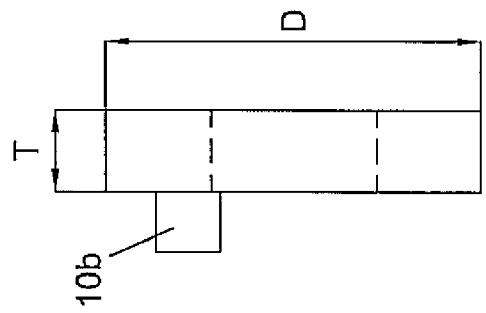
FIGS. 6A-6D schematically show, a front view, a rear view, a side view and a bottom view of no-turn washer, respectively.
Figure 6A:
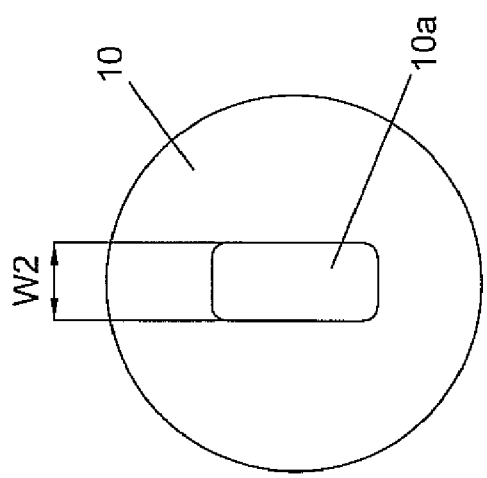
Figure 6D:
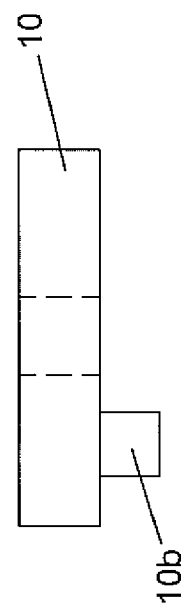
Figure 6B:
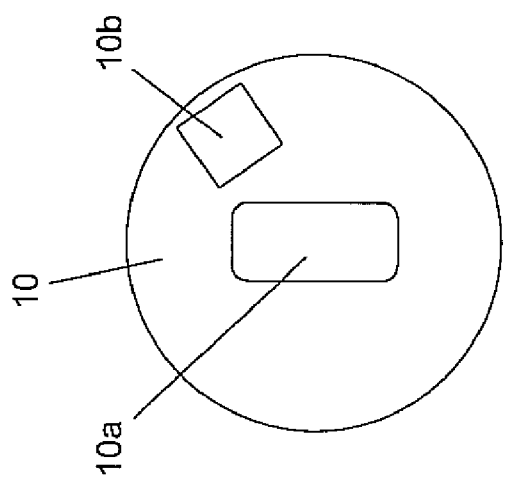
Figure 8:
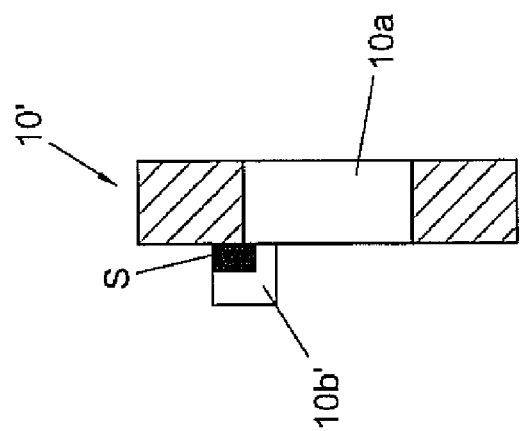
FIG. 8 shows a similar cross section as FIG. 7B, of an alternative elaboration of the ring.

In the present exemplary embodiment, at least a no-turn washer 10 (shown in FIGS. 1-3) is provided with sensor means. FIGS. 7-9 show further elaborations 10, 10', 10" of such a washer. Preferably, the sensor S is designed for measuring one or more of mechanical load, deformation, pressure, stress, and bending of and/or action on the respective rotation blocking element (at least the washer) 10, and for producing, for instance, an associated measuring signal (which signal comprises for instance a measured value).

As is already mentioned, the sensor S as such can be configured in different manners. The sensor can for instance comprise a stress sensor, pressure sensor, Hall-sensor and/or a different type of sensor. The sensor S can comprise one or more strain gauges, and/or piezoelectric material and/or be designed in a different manner. It is advantageous when the sensor S is design for producing an electric (measuring) signal, at least during use. The sensor S may be designed for producing an analogue sensor signal, a digital sensor signal. FIGS. 1, 2, 7A show schematic use of a signal conductor 16, for instance wiring, with which the sensor can communicate with an optional signal processor 17, or, at least, can give a measuring signal to such a signal processor 17. Alternatively, such signal transmission can proceed via, for instance, wireless communication means. The signal conductor may further be partly or wholly integrated in the bicycle frame 3. The optional signal processor 17 can for instance be designed for determining, on the basis of a measuring signal produced by the sensor S, at least one bicycle use parameter, for instance pedal force, torque and/or chain force (see further). As mentioned, such a processor can be designed in different manners; according to a further elaboration, the processor is for instance integrated with the sensor S, in which case the washer 10 is also provided with the processor.

Figure 7B:
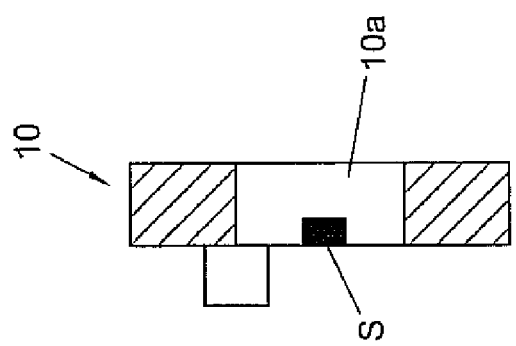
FIG. 7B shows a cross sectional view over line X-X of FIG. 7A.
Figure 7A:
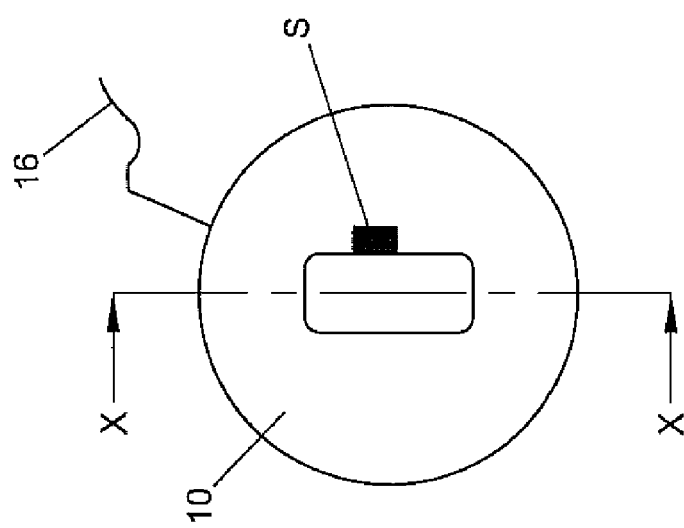
FIG. 7A shows a similar view as FIG. 6A of a further elaboration of a no-turn washer.

FIGS. 7A-7B show a further elaboration wherein the sensor S is arranged in the annular element 10, for instance along the axle passage 10a. The sensor S may be arranged in and/or on the washer 10 such that after assembly, the sensor mechanically touches the wheel axle 5. According to an advantageous alternative, the sensor S is provided in or on the no-turn washer 10 such that after assembly, the sensor is at a distance from the axle 5.

FIG. 8 schematically shows an alternative elaboration, wherein the sensor S is located in, at least forms part of said blocking nose 10b' of the no-turn washer 10'.

FIG. 9 shows an alternative elaboration, which is distinguished from the no-turn washer represented in FIG. 7A in that two sensors S1, S2 are integrated with the washer 10". In this case, the sensors S1, S2 are on both sides of the axle passage 10a", more particularly opposite each other, and more particularly such that after assembly, the blocking surfaces V of the axle extend along the sensors S1, S2.

During use of the bicycle 1, the sensor S of the no-turn washer 10 can produce a measuring signal, which measuring signal is processed (for instance by the processor 17) for determining at least one bicycle use parameter, for instance pedal force, torque and/or chain force.

Figure 4:
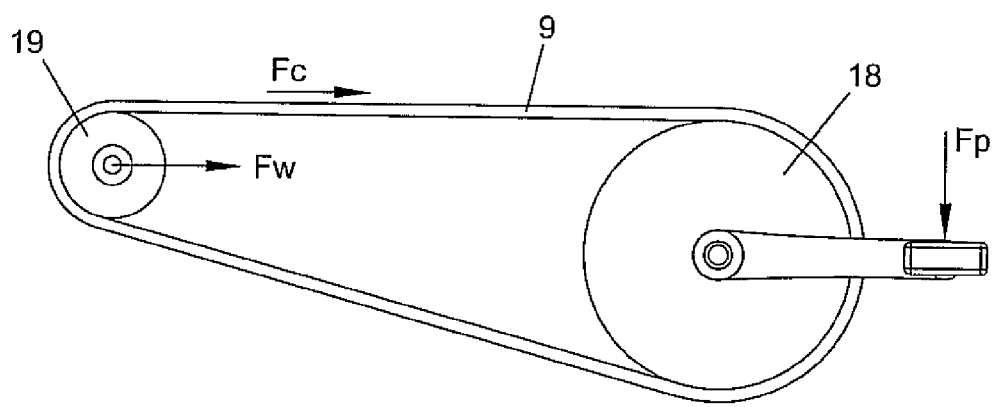
FIG. 4 shows a schematic view of the bicycle, during use.

As follows in particular from FIG. 4, under the influence of cycling, whereby the cyclist applies a force Fp to the pedals, a force $F_w$ is applied to the no-turn washer 10. More particularly, the pedal force Fp can result in a moment that is transmitted to a foremost sprocket 18. Via the chain 9, the foremost sprocket 18 applies a secondary moment and a force Fc to the rearmost sprocket 19, for setting the bicycle rear wheel into rotation relative to the bicycle frame. The forces also lead to a particular, associated force and/or pressure which act on the no-turn washer 10, and can therefore be detected by the sensor S. Thus, the pedal force Fp may lead to a bending stress in the rear axle pin, which bending stress leads to a pressure on the no-turn washer 10 which is measurable by the sensor S.

According to a further elaboration, the use of the sensor S comprises a method for controlling an auxiliary motor M of the bicycle 1, for instance the hub motor M. In that case, the auxiliary motor M can for instance be controlled while utilizing at least one bicycle use parameter which is determined by the sensor S of the no-turn washer 10.

In this manner, a compact and reliable sensor system can be provided, which can be easily accessed and, if desired, disassembled. In a surprisingly simple manner, the sensor S may provide performances of a cyclist, or information relating to driving force produced by the cyclist via the chain 9. Furthermore, information provided by the sensor S is suitable to be utilized as parameter in the control of an optional auxiliary motor M.

Figure 10:
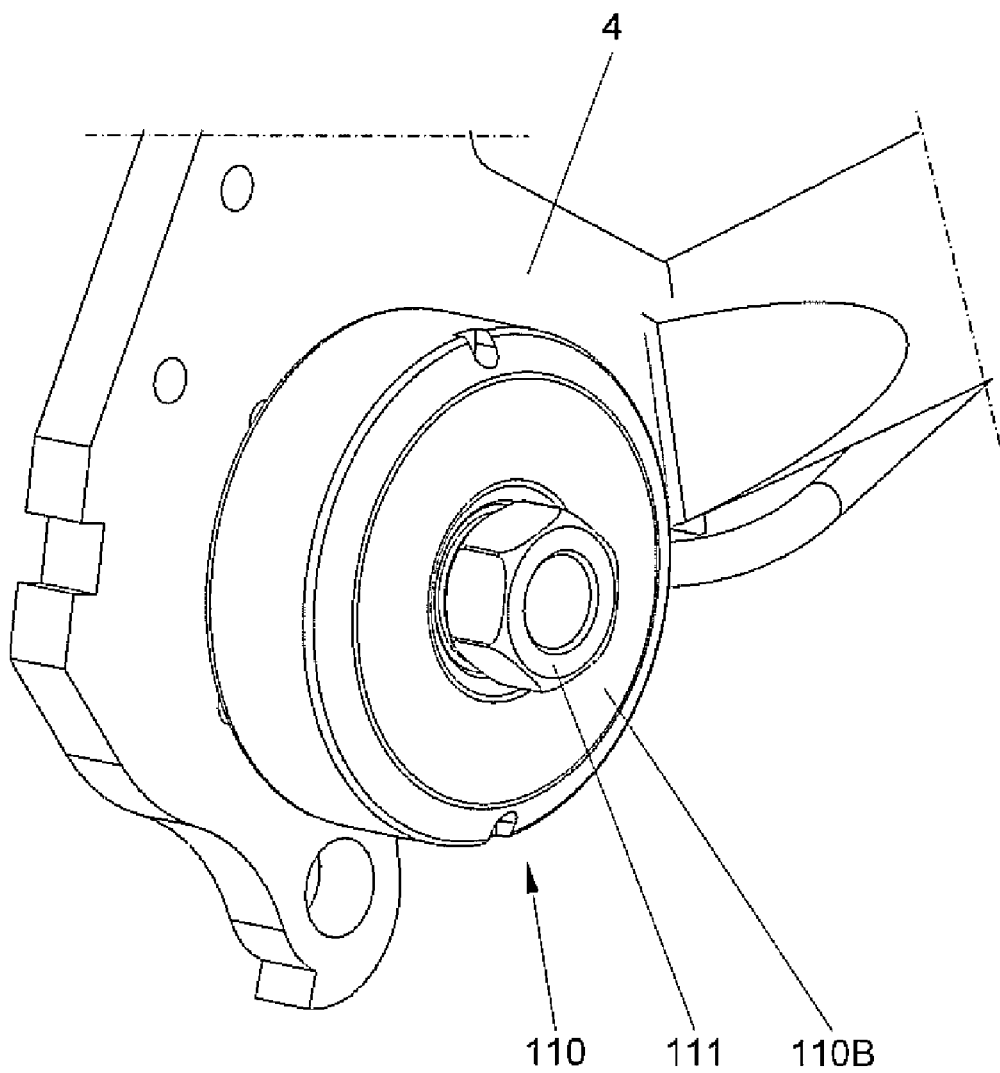
FIG. 10 shows a part of a further exemplary embodiment, in perspective drawing.
Figure 11:
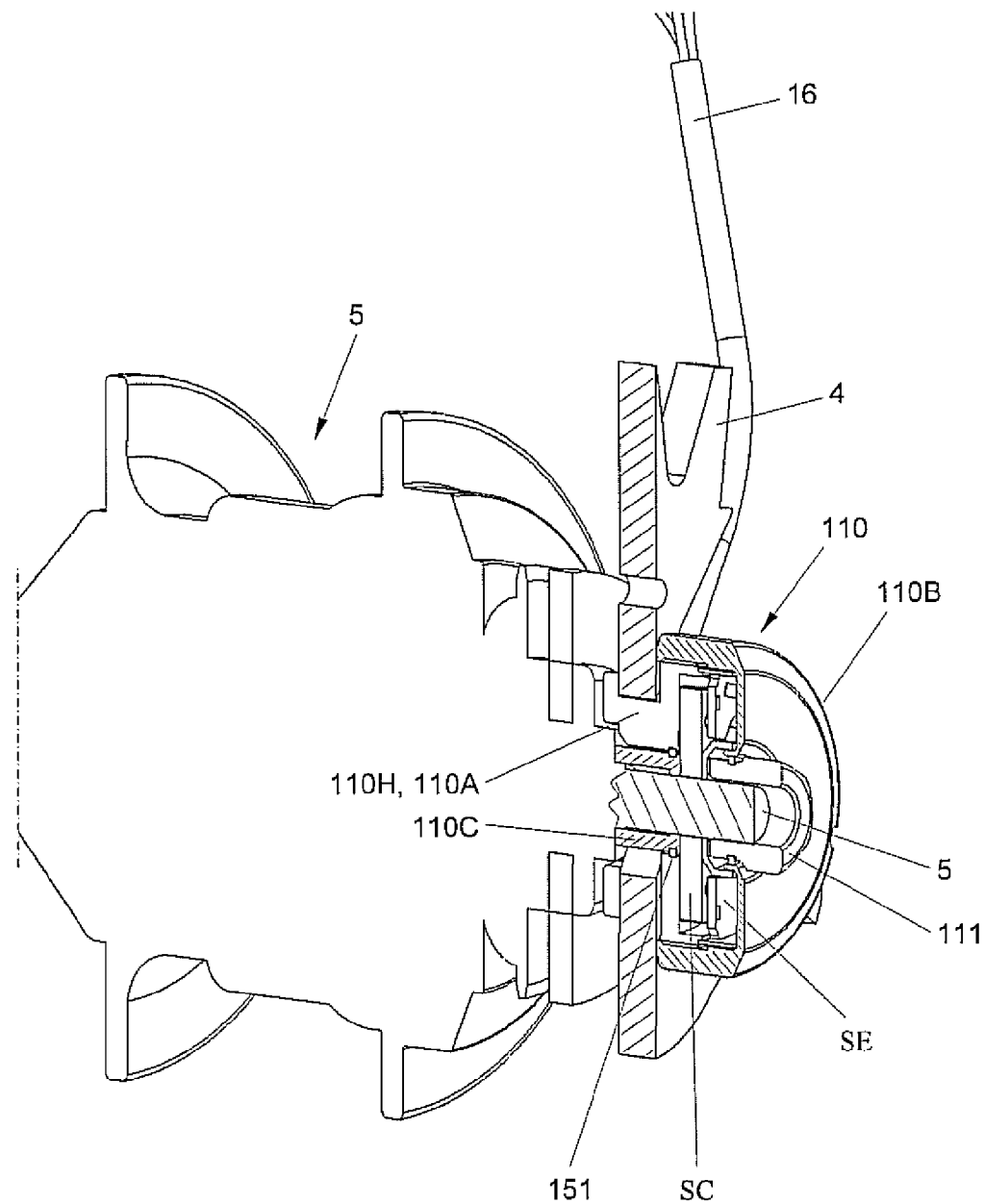
FIG. 11 schematically shows a cross sectional view of the example shown in FIG. 10.
Figure 12:
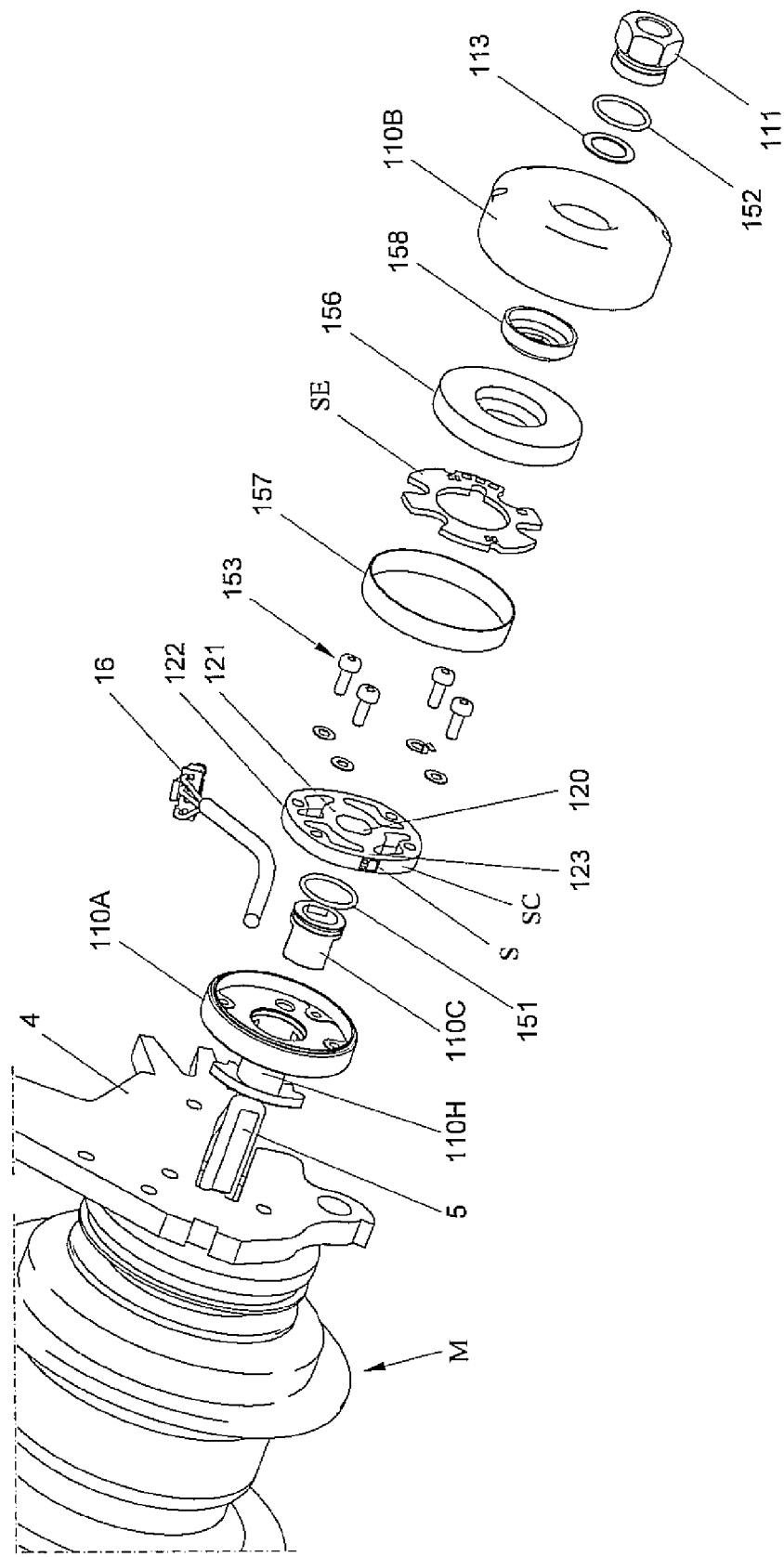
FIG. 12 shows the example shown in FIGS. 10-11 in disassembled condition.

FIGS. 10-12 show a further elaboration 110 of the invention, the operation of which is substantially equal to the operation of the above-described examples. The present detachable means 110 is again a (substantially annular) bicycle axle no-turn washer.

As shown in FIGS. 10-12, the no-turn washer 110 may be provided with a housing 110A, 110B and a sensor carrier SC.

In this case, the carrier SC is included in a cavity surrounded by the sensor housing 110A, 110B.

The housing comprises, for instance, a first housing part 110A and a second housing part 110B (for instance a cover) which, after assembly, surround a space in which the one or more sensors S (and respective carrier SC) are arranged. The housing 110A, 110B is preferably substantially annular, as is the case in this example. Furthermore, after assembly, the housing is preferably splashproof such that a content SC, SE of the housing 110A, 110B is screened from rain and pollution.

As shown in the drawing, a wheel axle 5 can be connected by means of a (blind) nut, via the present no-turn washer 110 to the bicycle frame. A sealing means, for instance a resilient O-ring 152, can be provided between the nut 111 and the housing 110A, 110B, for sealing a slit between the second housing part 110B and the nut 111. In this example, also, an optional intermediate ring 113 is provided for the purpose of supporting the nut 111 (in this case against a cup-shaped inner bush 158 included in the sensor housing). In this example, the blind nut 111 is located at a distance from the sensor carrier SC, at least an intermediate ring 113 and an inner bush 158 reach between facing sides of the nut 111 and carrier SC. As further shown in the Figures, after assembly, the nut 111 can be somewhat sunken in the sensor housing 110A, 110B.

In this example, the sensor housing 110A,110B is designed for engaging both a bicycle frame part 4 (namely the slot of a dropout end 4) and the sensor carrier SC, for blocking axle rotation with respect to the bicycle frame.

The first housing part 110A comprises, for instance, a blocking part 110H which engages the dropout end slot on the bicycle frame, to prevent rotation between the housing 110 and the bicycle frame. In this example, the housing is further provided with an optional sealing bush (filling piece) 110C which, after assembly, reaches between blocking part 100H of the housing and the wheel axle 5. The bushing 110C may be designed for filling up a slot between the housing part 110A and the axle 5. The bushing (filling piece) 110C is in particular designed to hold the hub of the wheel axle 5 at a distance from the part 4 (and from remaining parts of the no-turn washer 110); to this end, after assembly, the part 110C can bear with an end face against the hub (see FIG. 11). A sealing means, for instance an O-ring 151 may be provided between the bush 110C and the first housing part 110A, for an especially good sealing.

In the example, the sensor carrier SC is coupled to the sensor housing 110A, 110B in a manner secured against rotation, for instance via screw or bolt means 153 or otherwise. The carrier SC can for instance be fixed on an inside of the first housing part 110A. Optionally, the carrier SC is provided with a number of openings, as is the case in this example, for the purpose of increasing carrier deformation under the influence of cyclist forces.

In this example, the carrier SC is substantially annular, and is provided with a passage for receiving the wheel axle 5. The sensor carrier SC is provided centrally with a passage 120, which is designed to engage the blocking surfaces of the axle 5, to effect a coupling secured against rotation between carrier SC and wheel axle 5.

In particular, the sensor carrier SC is manufactured in one piece. The present carrier SC comprises an inner part 121 (which comprises the passage 120), an outer part 122 surrounding the inner part 121 and distancing means 123 that hold the inner and outer part 121, 122 at a distance from each other. The inner and outer part 121, 122 are each for instance substantially annular. After assembly, the carrier inner part 121 in the example is clamped between the nut 111 and the free bush 110C. The carrier outer part 122 is connected to the first housing part 110A by the connecting means 153.

The one or more sensors S can each be designed for detecting deformation of the carrier SC. Each sensor S can be integrated with the carrier SC or be connected thereto in different manners for the purpose of detecting such deformation. The one or more sensors S may be designed for detecting deformation of the outer part 122 with respect to the inner part 121, and/or deformation of said distancing means 123. Preferably, the one or more sensors S are arranged such that after assembly, they can detect substantially only horizontal deformation of the carrier SC, and can substantially not detect possible vertical deformation and optional torsion of the carrier SC. To this end, a front side and rear side of the carrier SC can each be provided with a sensor S (see FIG. 12, where such a sensor is provided on a rear side) in particular a front and rear side which, after assembly, extend vertically of have virtual vertical interfaces.

In this example, the housing of the bicycle axle no-turn washer 110 also comprises sensor signal processing means SE, for instance an electronic circuit, a controller, memory and/or the like. The processing means SE can for instance comprise a disc-shaped PCB, which, after assembly, extends along the sensor carrier SC (see FIG. 11), or be designed in a different manner. The present PCB SC is (centrally) provided with an opening through which the bicycle axle 5 and the fixing nut 11 (and an optional bush 158) reach, after assembly.

The sensor housing can further comprise various optional filling means or positioning means, for instance a ring 157 and holder 156 for positioning, protecting and/or the like components present in the housing 110A, 110B.

The example shown in FIGS. 10-12 is particularly compact and durable, can provide good measuring results and is widely applicable.

It will be clear to the skilled person that the invention is not limited to the exemplary embodiments described. Various modifications are possible within the framework of the invention as set forth in the following claims.

For instance, according to one elaboration, a sensor can for instance be utilized for the purpose of controlling an auxiliary motor of the bicycle. The sensor can also be used for the purpose of controlling other, optional, bicycle parts, for instance a controllable automatic acceleration system.

According to an advantageous elaboration (not represented), a detachable means 10, 110 also comprises a chain tensioner or chain tensioning component. Such a chain tensioner or chain tensioning component can for instance comprise a screw thread, on which a chain tensioning (wing) nut and tensioning slide can engage for tensioning a bicycle chain (before the axle 5 is fixed by means of for instance a nut 11, 111). Such chain tensioning component can for instance be manufactured in one piece or be fixedly connected to said first housing part 110A or blocking part 110H of the elaboration shown in FIGS. 10-12.

What is claimed is:

1. A bicycle, provided with wheels rotatable about axles, which axles are coupled by means of detachable means, in a manner secured against rotation, to a frame of the bicycle, characterized in that the said means of at least one of said axles are provided with a sensor, wherein the sensor is provided with a sensor carrier, which is integrated in a sensor housing, wherein the sensor is for detecting deformation of the carrier.

2. A bicycle, provided with wheels rotatable about axles, which axles are coupled by means of detachable means, in a manner secured against rotation, to a frame of the bicycle, characterized in that the said means of at least one of said axles are provided with a sensor, wherein the sensor is integrated with an axle rotating blocking element, which element is configured for blocking axle rotation after assembly.

3. A bicycle according to claim 2, wherein, after assembly, the sensor is provided between, on the one side, nut means engaging the respective axle and, on the other side, a part of the bicycle frame.

4. A bicycle according to claim 2, wherein the detachable means is provided with said sensor is fitted on an axle part, which axle part reaches axially outwards with respect to a bicycle frame part.

5. A bicycle according to claim 2, wherein the sensor forms part of an annular element, of which an axial thickness is smaller than a diameter of an outer circumference.

6. A bicycle according to claim 2, wherein the axle comprises at least one end piece with a non-circular outer contour, wherein the sensor forms part of an axle engaging element, which element is designed to cooperate with the non-circular outer contour of the axle end piece for blocking rotation of the axle with respect to a bicycle frame part.

7. A bicycle according to claim 2, wherein the axle rotating blocking element is the axle engaging element, and is provided with a blocking nose which engages a slot of a dropout end of the bicycle frame.

8. A bicycle according to claim 2, wherein the sensor is designed for measuring one or more of at least one of mechanical load, deformation, pressure, stress and bending of, or acting on the respective means.

9. A bicycle according to claim 2, wherein the axle whose said means are provided with a sensor, is the axle of a wheel driven by a chain, wherein the axle is provided in with a hub.

10. A bicycle according to claim 2, wherein the sensor is designed for producing a measuring signal, wherein the bicycle is provided with a processor designed for determining, on the basis of the measuring signal, at least one bicycle use parameter.

11. A sensor, evidently intended and suitable to be utilized in the bicycle according to claim 2, which sensor is integrated with the detachable means, the detachable means having a first position coupling the wheel axle to the frame of the bicycle, in a manner secured against rotation, the detachable means having a second position detached from the frame of the bicycle.

12. A sensor according to claim 11, wherein the sensor forms part of an axle rotating blocking element.

13. A method of utilizing a sensor according to claim 11, wherein the sensor forms part of a bicycle, the method including the steps of:
producing a measuring signal,
processing the measuring signal; and
determining at least one bicycle use parameter based on the measuring signal.

14. A method for determining at least one bicycle use parameter generated by or under the influence of a cyclist, wherein the bicycle is provided with a sensor according to claim 11 for producing a measuring signal, the method including the steps of processing said measuring signal for the purpose of determining the bicycle use parameter.

15. A method for controlling a controllable bicycle part wherein the bicycle part is controlled while undertaking a step of utilizing at least one bicycle use parameter which is determined by a sensor according to claim 11.

16. A method for controlling a controllable bicycle part, wherein the bicycle part is controlled while undertaking a step of utilizing at least one bicycle use parameter which is determined by means of a method according to claim 14.

17. A bicycle according to claim 4, wherein the detachable means is fitted between the bicycle frame part and an axle fixing means.

18. A bicycle according to claim 4, wherein the detachable means is clamped between the bicycle frame part and an axle fixing means.

19. A bicycle according to claim 2, wherein the bicycle has a use parameter that is selected from at least one of pedal force, torque and chain force.

20. A sensor according to claim 19, wherein the axle rotating blocking element is a no-turn washer.

21. The method of claim 13, wherein said parameter is selected from at least one of pedal force, torque and chain force.

22. The method of claim 14, wherein said bicycle use parameter is selected from at least one of pedal force, torque and chain force.

23. The method of claim 15, wherein said controllable bicycle part is selected from at least one of an auxiliary motor and an acceleration system.

24. The method of claim 16, wherein said controllable bicycle part is selected from at least one of an auxiliary motor and an acceleration system.

25. A bicycle according to claim 2, wherein an axle rotating blocking element is a no-turn washer.

26. A bicycle according to claim 9, wherein the hub is provided with a hub motor.

27. A bicycle according to claim 2, wherein the sensor is provided with a sensor carrier, which is integrated in a sensor housing, wherein the sensor is for detecting deformation of the carrier.

* * * * *